Patented Apr. 7, 1953

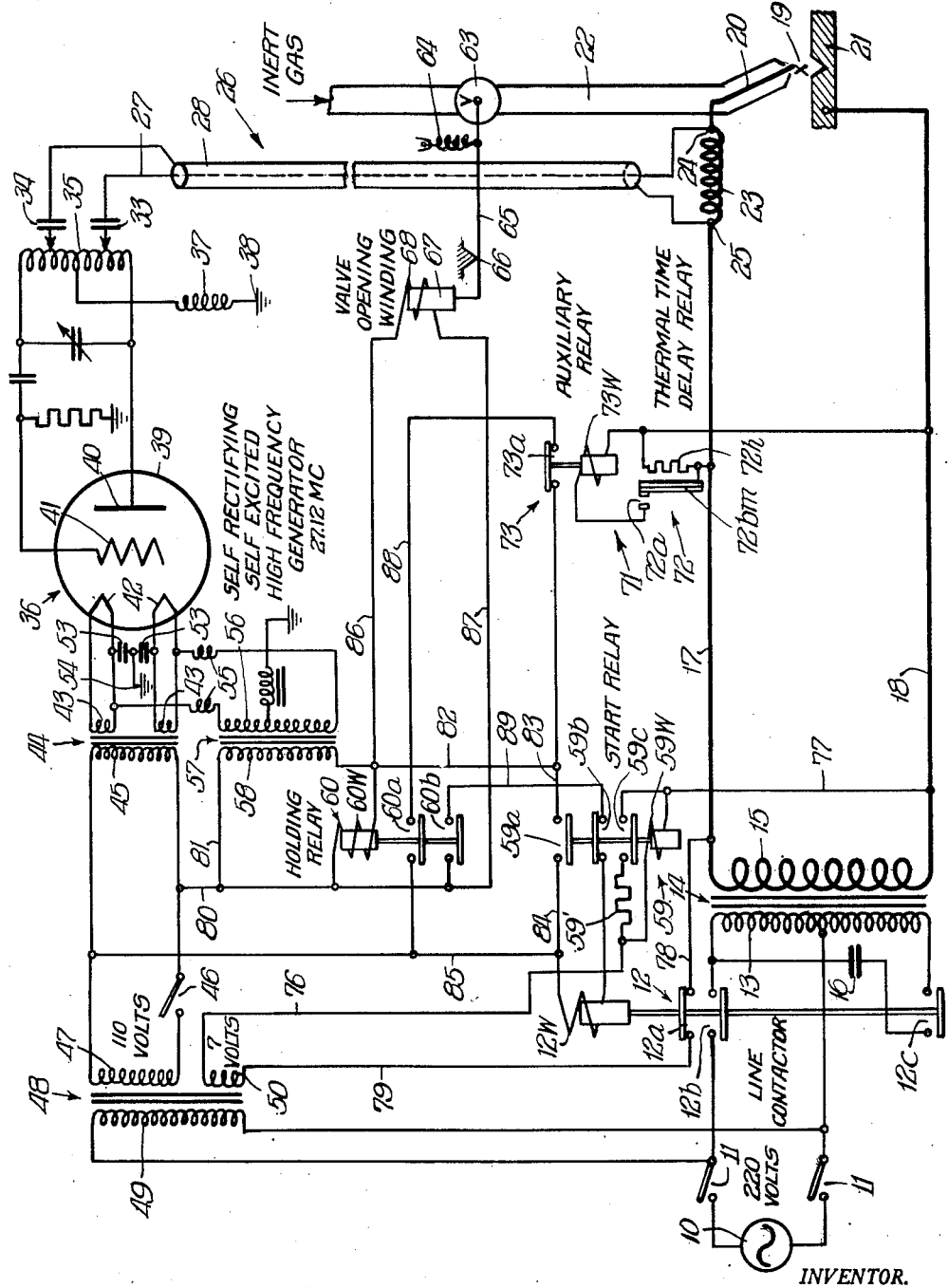

2,634,355

UNITED STATES PATENT OFFICE 2,634,355

ARC WELDING SYSTEM

Dean C. Girard, San Leandro, Calif., assignor, by mesne assignments, to National Cylinder Gas Company, a corporation of Delaware Application February 24, 1949, Serial No. 78,208

16 Claims. (Cl. 219—8)

This invention relates, generally, to arc welding systems, and it has particular relation to gas shielded arc welding systems in which the arc is stabilized by superimposed high frequency. Further, this invention has to do with improvements over the arc welding system disclosed in copending application, Serial No. 67,795, filed December 29, 1948, in the names of Dean C. Girard and Frank T. Roach, and assigned to the assignee of this application with respect to which application Serial No. 148,162 was filed March 7, 1950, as a continuation, now Patent No. 2,573,901, issued November 6, 1951.

In this copending application a welding system is disclosed in which a transformer is employed for energizing a welding circuit to maintain an arc on closure of a line contactor which connects the primary winding of the transformer to a source of alternating current. A gaseous atmosphere surrounds the arc to improve welding conditions. The arc is stabilized by superimposing thereon high frequency from a high frequency generator of the electric valve type. The system is initiated in operation by a start relay whose operating winding is connected for energization to a separate source and in series with the welding circuit when it is short circuited. The closing of the start relay effects the energization of the high frequency generator and causes the same to radiate energy. In response to the radiation of energy by the high frequency generator, a generator relay is closed so that, when the short circuit on the welding circuit is removed by withdrawing the electrode a short distance from the work and the start relay drops, the circuit for energizing the high frequency generator is maintained. Also a circuit is completed for energizing the operating winding of the line contactor. It closes and the primary winding of the transformer is energized. The welding operation then can proceed. When the welding electrode is moved far enough from the work so that no arc can be maintained therebetween, the generator is unloaded and the generator relay drops. As a result the generator ceases to radiate, the line contact drops and the welding circuit is deenergized.

Among the objects of this invention are: To cause the high frequency generator to cease to radiate as a result of the removal of the load on the welding circuit; to cause the line contactor to drop for the same reason; to cause these functions to take place a predetermined time after the load is removed from the welding circuit; to take advantage of the increase in voltage across the welding circuit when the arc is extinguished to effect the desired control function; to open a valve for supplying the gaseous atmosphere around the arc simultaneously with the initiation in operation of the high frequency generator; and to close the valve when the high frequency generator ceases to radiate.

These objects, in general, are attained through the use of a time delay relay means connected across the circuit. This relay means may include a thermal time delay relay whose heating element is connected across the welding circuit and which has a bimetallic element arranged to close normally open contacts a predetermined time after full open circuit voltage is applied to the heating element. These contacts, on closing, complete a circuit for energizing the winding of an auxiliary relay whose normally closed contacts are connected in series with the contacts of a holding relay that takes the place of the generator relay in the system of said copending application. On opening of these auxiliary relay contacts, the windings of the holding relay and of the line contactor are deenergized and they drop. The high frequency generator ceases to radiate and the welding circuit is deenergized. A valve is provided in the conduit which supplies the gaseous atmosphere for blanketing the welding arc, and it has an operating mechanism which includes a winding that may be energized and deenergized with the winding of the holding relay and the initiating and arresting of radiation of the high frequency generator. Other objects of this invention will, in part, be obvious and in part appear hereinafter.

This invention is disclosed in the embodiment thereof shown in the accompanying drawing, and it comprises the features of construction, combination of elements, circuit connections, and arrangement of parts which will be exemplified in the description hereinafter set forth and the scope of the application of which will be indicated in the appended claims.

For a more complete understanding of the nature and scope of this invention, reference may be had to the following detailed description taken together with the accompanying drawing in which the single figure illustrates diagrammatically the circuit connections and apparatus which may be employed in practicing this invention.

Referring now particularly to the drawing, it will be observed that the reference character 10 designates a source of alternating current, such as a 220 volt 60 cycle source. It will be understood that other voltages and frequencies can be employed, the particular values specified being for illustrative purposes only. The source 10 may be connected by line switches 11 and a line contactor, shown generally at 12, to energize a primary winding 13 of a welding transformer that is shown, generally, at 14. The welding transformer 14 includes a secondary winding 15 whose open circuit voltage may be of the order of eighty to ninety volts. The line contactor 12 includes an operating winding 12w, normally closed contacts 12a whose function will be described hereinafter, and normally open contacts 12b and 12c. It will be observed that the contacts 12b, when closed, serve to connect the primary winding 13 for energization to the source 10 when the switches 11 are closed. Contacts 12c are provided to connect a capacitor 16 across the primary winding 13 for power factor correction.

The secondary winding 15 of the welding transformer 14 may be connected by conductors 17 and 18 to supply current for maintaining a welding arc 19 between an electrode 20, which may be of the non-consumable type, and work 21 on which the welding operation is to be performed. An inert gas, such as argon, may be supplied through a conduit 22 around the electrode 20 and the arc 19 in accordance with conventional shielded arc welding practice.

Since the welding arc 19 is supplied from the secondary winding 15 of the welding transformer 14 with relatively low frequency alternating current, difficulty is encountered in striking and maintaining the arc. The tungsten electrode 20 should not touch the work 21 except to a very minor extent for it will be contaminated and interfere with proper operation. In order to assist in striking and maintaining the arc, provision is made for superimposing on it a current of a relatively high frequency. For this purpose frequencies in the band from 26.96 to 27.28 megacycles have been set aside tentatively. A frequency of 27.12 megacycles has been chosen from this permissible band of frequencies for stabilizing the operation of the arc 19.

The stabilizing high frequency is supplied to the arc 19 in close proximity thereto. For this purpose an inductor 23 is connected between the welding electrode 20 and the conductor 17, as shown. The inductor 23 has terminals 24 and 25. It will be noted that the terminal 24 is immediately adjacent the electrode 20 while the terminal 25 provides for connection to the welding lead or conductor 17.

The stabilizing high frequency is applied across the inductor 23 by means of a co-axial cable that is shown, generally, at 26. It will be noted that the inner conductor 27 of the co-axial cable 26 is connected to the terminal 24 of the inductor 23 which is adjacent the electrode 20 and the arc 19. The outer conductor 28 of the co-axial cable 26 is connected to the other terminal 25 of the inductor 23. It will be understood that the length of the co-axial cable 26 is chosen with respect to the wave length of the stabilizing frequency employed so that the high frequency current is transmitted therethrough with a minimum of loss and a maximum of efficiency. Overheating of the co-axial cable 26 is avoided. At the same time sufficient power is available across the inductor 23 to provide the desired stabilizing effect on the arc 19.

The conductors 27 and 28 which comprise the co-axial cable 26 may be connected through capacitors 33 and 34 to an inductor 35. As illustrated, the connections between the capacitors 33 and 34 and the inductor 35 are variable in order to permit adjustment of the tuning as may be required. The inductor 35 forms a part of a self-rectifying self-excited high frequency generator which is indicated, generally, at 36. The inductor 35 has a center tap, as shown, which is connected through a radio frequency choke coil 37 to ground at 38.

The generator 36 includes a double triode electric valve 39 which is of known design and construction. Type 304TL has been found satisfactory for the purposes of the generator 36. It will be understood, however, that two separate single triode valves can be employed, if desired, in lieu of the double triode electric valve 39 illustrated.

The valve 39 includes an anode or plate 40 and a control grid 41, these being connected, as shown, to the ends of the inductor 35. The valve 39 also includes a pair of hot cathodes 42 which may be heated by secondary windings 43 of a filament transformer, shown generally, at 44, which has a primary winding 45.

Any suitable means can be provided for energizing the primary winding 45. As shown, a switch 46 is employed for connecting the primary winding 45 for energization across a secondary winding 47, operating at 110 volts, which forms a part of a transformer, shown generally at 48. The transformer 48 has a primary winding 49 which may be connected for energization across the source 10 when the switches 11 are closed. In addition the transformer 48 has a low voltage secondary winding 50 arranged, as indicated, to operate at about seven volts, and used for a purpose to be described presently.

As indicated, the generator 36 is of the self-rectifying type. In order to accomplish this radio frequency choke coils 55 interconnect the circuits to the hot cathodes 42 with a secondary winding 56 of a plate transformer that is indicated, generally, at 57. A primary winding 58 forms another part of the transformer 57 and it is arranged to be connected in a manner to be described presently for energization across the secondary winding 47 of the transformer 48.

It is desirable that the high frequency generator 36 function only during the time that the arc 19 is maintained between the electrode 20 and the work 21. This reduces the likelihood of radio interference since there is none when the generator 36 is not functioning and radiation is at a minimum when the arc 19 is being maintained. In order to initiate the generator 36 in operation when it is desired to strike the arc 19 a start relay, shown generally at 59, is provided. The start relay 59 includes an operating winding 59w, normally open contacts 59a and normally closed contacts 59b. The start relay 59 also may have normally open contacts 59c which, when closed, connect a resistor 59' in parallel with the winding 59w. The resistor 59' may be employed for the purpose of insuring that the relay 59 always will drop out at substantially the same value of current flowing through its energizing circuit when the welding electrode 20 is withdrawn from the work 19 preparatory to initiating subsequently the welding operation.

When the start relay 59 pulls a circuit is completed at contacts 59a, which will be traced hereinafter, for connecting the primary winding 58 of the transformer 57 for energization across the 110 volt winding 47 of the transformer 48. This serves to energize the plate circuit of the valve 39 and causes the high frequency generator 36 to radiate energy. In order to maintain the energizing circuit for the primary winding 58 closed, a holding relay, shown generally at 60, may be employed. This relay includes an operating winding 60w and two sets of normally open contacts 60a and 60b.

It is desirable that the flow of gas through the conduit 22 takes place only during the time that the welding operation is being performed. Further, it is desirable to turn the gas on automatically and to turn it off rather than to require that this be done manually by the operator. For this purpose a gas valve 63 may be connected in the conduit 22 and a spring 64 may be provided for biasing it to the closed position. The valve 63 may be opened by a lever 65 which may be fulcrumed at 66 and connected for operation to an armature 67 whose position is controlled by a winding 68. As will appear hereinafter, the winding 68 is energized in response to the pulling of the start relay 59 and it is maintained energized by the holding relay 60.

At the termination of the welding operation by the withdrawal of the electrode 20 sufficiently far from the work 21 so that no arc is maintained therebetween, it is desirable that the high frequency generator 36 cease to radiate, that the valve 63 be closed and that the line contactor 12 be opened. In order to accomplish these functions in response to the change in load on the welding circuit represented by the conductors 17 and 18, time delay relay means, shown generally at 71, may be employed. This relay means 71 includes a time delay relay, shown generally at 72, which comprises a heater element 72h that may be connected, as shown, for energization across the conductors 17 and 18. The heater element 72h is placed alongside of a bimetallic strip 72bm which is arranged to close normally open contacts 72a when sufficient heat is applied to the bimetallic strip 72bm by the heater 72h. This takes place when the open circuit voltage exists between the conductors 17 and 18. It will be understood that, while the arc 19 is being maintained, the voltage across the secondary winding 15 of the transformer 14 is of the order of from twenty to thirty volts and the design and construction of the time delay relay 72 is such that, when the heater element 72h is energized from this low voltage, sufficient heat is not generated to flex the bimetallic element 72bm sufficiently to close the contacts 72a. However, when open circuit voltage is applied to the heater element 72h, the contacts 72a are closed after a predetermined interval which, for example, may be of the order of five seconds after the welding arc 19 has been extinguished. Cooperating with the time delay relay 72 is an auxiliary relay that is indicated, generally, at 73. It includes an operating winding 73w and normally closed contacts 73a. When the contacts 72a of the time delay relay 72 are closed, the winding 73w is connected for energization across the conductors 17 and 18 and, as a result, contacts 73a are opened to open the energizing circuit for the winding 60w of the holding relay 60, as will be described presently, to cause it to drop and perform the functions indicated above. While the winding 73w of the auxiliary relay 73 is illustrated as being connected for energization across the conductors 17 and 18, it will be understood that it may be connected for energization to any suitable source such as that provided by the secondary winding 47 of the transformer 48. Also, instead of providing normally open contacts 72a on the time delay relay 72, it may be provided with normally closed contacts and these contacts may be connected in the circuit in lieu of the contacts 73a of the auxiliary relay 73. When this alternate construction is employed, it is unnecessary to use the auxiliary relay 73.

In describing the functioning of the system shown in the drawing, it will be assumed that the switches 11 and 46 have been closed and that the line contactor 12 and relays 59 and 60 are in the deenergized or dropped positions shown in the drawing. Also it will be assumed that the welding electrode 20 is out of contact with the work 21. The impedance of the secondary winding 15 is high enough to prevent energization of the winding 59w of the start relay 59 therethrough.

Now it will be assumed that the operator momentarily touches the electrode 20 on the work 21. As soon as this takes place a circuit is completed for energizing the operating winding 59w of the start relay 59 since it is now connected in series circuit relation with the welding circuit comprising the conductors 17 and 18. This energizing circuit may be traced from the seven volt winding 56 through conductor 76, operating winding 59w, conductor 77, conductor 18, work 21, electrode 20, inductor 23, conductors 17 and 78, normally closed contacts 12a, and conductor 79 back to the secondary winding 50.

As soon as the operating winding 59w of the start relay 59 is energized in the manner just described, the circuit to the operating winding 12w of the line contactor 12 is opened at contacts 59b and at contacts 59a a circuit is completed for energizing the primary winding 58 of the plate transformer 57. This circuit may be traced from one terminal of the secondary winding 47 through conductors 80 and 81, primary winding 58, conductors 82 and 83, contacts 59a, conductors 84 and 85, back to the other terminal of the secondary winding 47. It will be observed that the operating winding 60w of the holding relay 60 is connected in parallel with the primary winding 58 of the transformer 57. Also it will be observed that the winding 68 which controls the opening of the valve 63 is connected by conductors 86 and 87 in parallel with the primary winding 58. Accordingly, on closure of the contacts 59a the winding 60w and the winding 68 are energized simultaneously with the energization of the primary winding 58. Accordingly, the valve 63 is opened and the inert gas flows through the conduit 22 around the electrode 20.

Nothing further happens until the operator withdraws the electrode 20 from the work 21 while maintaining it close thereto so that the arc 19 now provided solely by the high frequency current from the generator 26 will continue. However, the previously traced circuit for energizing the operating winding 59w of the start relay 59 is opened and this relay drops. Although contacts 59a of the start relay 59 are opened by the dropping of this relay, the circuits for energizing the primary winding 58 of the transformer 57, the operating winding 60w of the holding relay 60, and the valve opening winding 68 are maintained energized through the closure of contacts 60a of the holding relay 60. It will be observed that these contacts 60a are connected in parallel with the contacts 59a through conductors 84 and 85 and also conductors 83 and 88. It will be noted that the normally closed contacts 73a of the auxiliary relay 73 are connected between the conductors 83 and 88 in this holding circuit so that, when the start relay 59 drops, the normally closed contacts 73a of the auxiliary relay 73 are connected in series with the contacts 60a of the holding relay 60.

The dropping of the start relay 59 completes a circuit at 59b for energizing the operating winding 12w of the line contactor 12. This circuit may be traced from one side of the secondary winding 47 of the transformer 48 through conductor 80, contacts 60b, conductor 89, contacts 59b, operating winding 12w, and conductor 85 to the other side of the secondary winding 47.

The line contactor 12 now picks up and at contacts 12b and 12c closes the circuits for energizing the primary winding 13 of the welding transformer 14 and connecting the capacitor 16 thereacross. Welding current now is induced in the secondary winding 15 of the welding transformer 14 and it flows through the conductors or welding leads 17 and 18 and the inductor 23 to provide the required current for maintaining the arc 19 to perform the welding operation, the arc 19 now being stabilized by the superimposed high frequency from the generator 26.

Since the contacts 12a are opened when the line contactor 12 is in the operated or pulled position, no current can flow through the operating winding 59w of the start relay 59. As pointed out above, the voltage across the conductors 17 and 18 while the welding arc 19 is being maintained is so low that the heater element 72h is not energized sufficiently to cause the bimetallic element 72bm to be flexed and close the contacts 72a. As long as the foregoing conditions exist and the electrode 20 is held close enough to the work 21 so that the welding arc is maintained, the system continues to function as described.

When the operator wishes to terminate the welding operation, he moves the electrode 20 sufficiently far from the work 21 so that an arc cannot be maintained therebetween. Immediately the voltage between the conductors 17 and 18 is the open circuit voltage of the secondary winding 15. The heater element 72h now has sufficient current flowing through it so that, after the interval for which it has been set elapses, the bimetallic element 72bm is flexed and contacts 72a are closed. This completes the energizing circuit for the winding 73w of the auxiliary relay 73 and its contacts 73a are opened. As previously set forth, these contacts are connected in series with the primary winding 58 of the plate transformer 57, operating winding 60w of the holding relay 60 and the valve opening winding 68, all of which are connected in parallel, so that they are deenergized at the end of this time interval. The high frequency generator 36 ceases to radiate. Since the winding 68 is deenergized, the spring 64 closes the valve 63. The holding relay 60 drops and at contacts 60b the energizing circuit for the operating winding 12w of the line contactor 12 is opened. This contact drops and the welding circuit including the transformer 14 is deenergized. The system now is restored to the initially assumed condition and, on resumption of welding operations, the cycle just described is repeated.

Since certain changes can be made in the foregoing construction and system and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. In a system for controlling the energization of an intermittently loaded power circuit in combination, a line contactor for connecting the power circuit for energization to a current source, a start relay when deenergized providing a part of an energizing circuit for closing said line contactor and connected to be energized on short circuiting of said power circuit when said line contactor is open, a high frequency generator connected to superimpose high frequency on said power circuit and to be initiated in operation by closing of said start relay, relay means connected to be responsive to the energization of said start relay for completing said energizing circuit for said line contactor when said start relay is deenergizing by opening said short circuit on said power circuit, and relay means connected to be responsive to the removal of load from said power circuit for stopping further operation of said generator and for deenergizing said line contactor.

2. In a system for controlling the energization of an intermittently loaded power circuit in combination, a line contactor for connecting the power circuit for energization to a current source, a start relay connected to be energized on short circuiting of said power circuit when said line contactor is open, a high frequency generator connected to superimpose high frequency on said power circuit and to be initiated in operation by closing of said start relay, a holding relay connected to be energized on closing of said start relay and arranged to effect the closure of said line contactor and to maintain said generator in operation on dropping of said start relay, and relay means connected to be responsive to the removal of load from said power circuit for stopping further operation of said generator.

3. In a system for controlling the energization of a power circuit adapted to be loaded intermittently by an arc which is arranged to be surrounded by a gaseous shielding medium, in combination, a line contactor for connecting the power circuit for energization to a current source, a start relay connected to be energized on short circuiting of said power circuit when said line contactor is open, a high frequency generator connected to superimpose high frequency on said power circuit to stabilize said arc and to be initiated in operation by closing of said start relay, valve means arranged to be opened on closure of said start relay to supply said gaseous shielding medium to the vicinity of said arc, and relay means connected to be responsive to the discontinuance of said arc for stopping further operation of said generator and effecting closure of said valve means.

4. In a system for controlling the energization of a power circuit adapted to be loaded intermittently by an arc which is arranged to be surrounded by a gaseous shielding medium, in combination, a line contactor for connecting the power circuit for energization to a current source, a start relay connected to be energized on short circuiting of said power circuit when said line contactor is open, a high frequency generator connected to superimpose high frequency on said power circuit to stabilize said arc and to be initiated in operation by closing of said start relay, valve means arranged to be opened on closure of said start relay to supply said gaseous shielding medium to the vicinity of said arc, a holding relay connected to be energized on closing of said start relay and arranged to effect closure of said line contactor and to maintain said generator in operation and said valve open on dropping of said start relay, and relay means connected to be responsive to the discontinuance of said arc for stopping further operation of said generator and effecting closure of said valve means.

5. In a system for controlling the energization of an intermittently loaded power circuit, in combination, a line contactor having an operating winding, normally open contacts for connecting said power circuit to a current source, and normally closed contacts; a start relay having an operating winding connected in series with said power circuit through said normally closed contactor contacts to a current source and energized on short circuiting of said power circuit, a set of normally closed contacts and a set of normally open contacts; a high frequency generator connected to superimpose high frequency on said power circuit and to be initiated in operation on closure of said normally open start relay contacts; a holding relay having a winding connected for energization on closure of said normally open start relay contacts and two sets of normally open contacts; circuit means connecting one set of holding relay contacts in parallel with said normally open start relay contacts to maintain said generator in operation and said holding relay winding energized when said start relay drops, and circuit means connecting said contactor winding for energization to a current source through said normally closed start relay contacts and the other set of generator relay contacts whereby on removal of the short circuit from said power circuit said start relay drops and said normally open line contactor contacts are closed.

6. In a system for controlling the energization of an intermittently loaded power circuit, in combination, a line contactor having an operating winding, normally open contacts for connecting said power circuit to a current source, and normally closed contacts; a start relay having an operating winding connected in series with said power circuit through said normally closed contactor contacts to a current source and energized on short circuiting of said power circuit, a set of normally closed contacts and a set of normally open contacts; a high frequency generator connected to superimpose high frequency on said power circuit and to be initiated in operation on closure of said normally open start relay contacts; a holding relay having a winding connected for energization on closure of said normally open start relay contacts and two sets of normally open contacts; circuit means connecting one set of holding relay contacts in parallel with said normally open start relay contacts to maintain said generator in operation and said holding relay winding energized when said start relay drops, circuit means connecting said contactor winding for energization to a current source through said normally closed start relay contacts and the other set of generator relay contacts whereby on removal of the short circuit from said power circuit said start relay drops and said normally open line contactor contacts are closed, and relay means including normally closed contacts connected in the first mentioned circuit means, said relay means being connected to be responsive to removal of load from said power circuit to open its normally closed contacts and thereby stop further operation of said generator and deenergize said windings of said holding relay and contactor.

7. In a system for controlling the energization of a power circuit adapted to be loaded intermittently by an arc which is arranged to be surrounded by a gaseous shielding medium, in combination, a line contactor having an operating winding, normally open contacts for connecting said power circuit to a current source, and normally closed contacts; a start relay having an operating winding connected in series with said power circuit through said normally closed contactor contacts to a current source and energized on short circuiting of said power circuit, a set of normally closed contacts and a set of normally open contacts; a high frequency generator connected to superimpose high frequency on said power circuit and to be initiated in operation on closure of said normally open start relay contacts; valve means arranged to be opened on closure of said normally open start relay contacts to supply said gaseous shielding medium to the vicinity of said arc, a holding relay having a winding connected for energization on closure of said normally open start relay contacts and two sets of normally open contacts; circuit means connecting one set of holding relay contacts in parallel with said normally open start relay contacts to maintain said generator in operation, said valve means open, and said holding relay winding energized when said start relay drops, and circuit means connecting said contactor winding for energization to a current source through said normally closed start relay contacts and the other set of generator relay contacts whereby on removal of the short circuit from said power circuit said start relay drops and said normally open line contactor contacts are closed.

8. In a system for controlling the energization of a power circuit adapted to be loaded intermittently by an arc which is arranged to be surrounded by a gaseous shielding medium, in combination, a line contactor having an operating winding, normally open contacts for connecting said power circuit to a current source, and normally closed contacts; a start relay having an operating winding connected in series with said power circuit through said normally closed contactor contacts to a current source and energized on short circuiting of said power circuit, a set of normally closed contacts and a set of normally open contacts; a high frequency generator connected to superimpose high frequency on said power circuit and to be initiated in operation on closure of said normally open start relay contacts; valve means arranged to be opened on closure of said normally open start relay contacts to supply said gaseous shielding medium to the vicinity of said arc, a holding relay having a winding connected for energization on closure of said normally open start relay contacts and two sets of normally open contacts; circuit means connecting one set of holding relay contacts in parallel with said normally open start relay contacts to maintain said generator in operation, said valve means open, and said holding relay winding energized when said start relay drops, circuit means connecting said contactor winding for energization to a current source through said normally closed start relay contacts and the other set of generator relay contacts whereby on removal of the short circuit from said power circuit said start relay drops and said normally open line contactor contacts are closed, and relay means including normally closed contacts connected in the first mentioned circuit means, said relay means being connected to be responsive to removal of load from said power circuit to open its normally closed contacts and thereby stop further operation of said generator, deenergize said windings of said holding relay and contactor and close said valve means.

9. In a system for controlling the energization of an intermittently loaded power circuit, in combination, a transformer having a primary winding and a secondary winding connected to the power circuit, a line contactor for connecting said primary winding for energization to a current source, a first relay connected to be energized on short circuiting of said power circuit when said line contactor is open, a second relay connected to be energized on energization of said first relay and arranged on removal of said short circuit and deenergization of said first relay to energize said line contactor to supply current to a load connected across said power circuit, and a third relay connected to be responsive to the removal of load from said power circuit for deenergizing said line contactor.

10. The invention, as set forth in claim 9, wherein the third relay includes time delay means whereby the removal of the load for a predetermined interval is required before the line contactor is deenergized.

11. In a system for controlling the energization of an intermittently loaded power circuit, in combination, a transformer having a primary winding and a secondary winding connected to the power circuit, a line contactor for connecting said primary winding for energization to a current source, a first relay connected to be energized in series with said power circuit on short circuiting thereof when said line contactor is open, a second relay connected to be energized on energization of said first relay and arranged on removal of said short circuit and deenergization of said first relay to energize said line contactor to supply current to a load connected across said power circuit, and a third relay connected to be responsive to the removal of load from said power circuit for deenergizing said line contactor.

12. In a system for controlling the energization of an intermittently loaded power circuit, in combination, a line contactor for connecting the power circuit for energization to a current source, a first relay connected to be energized on short circuiting of said power circuit when said line contactor is open, a high frequency generator connected to superimpose high frequency on said power circuit and to be initiated in operation by closing of said first relay, a second relay connected to be energized on closing of said first relay and arranged to maintain said generator in operation and on removal of said short circuit and consequent dropping of said first relay to energize said line contactor to supply current to a load connected across said power circuit, and a third relay connected to be responsive to the removal of load from said power circuit for stopping further operation of said generator and deenergizing said line contactor.

13. In a system for controlling the energization of an intermittently loaded power circuit, in combination, a line contactor for connecting the power circuit for energization to a current source and having normally closed contacts, a first relay connected to be energized through said normally closed contacts on short circuiting of said power circuit and having normally closed and normally open contacts, a second relay connected to be energized on closure of said normally open contacts of said first relay on energization thereof and having two sets of normally open contacts, one of said two sets of normally open contacts being connected in parallel with said normally open contacts of said first relay for maintaining said second relay energized and the other of said two sets of normally open contacts being connected in series with said normally closed contacts of said first relay for energizing said line contactor on removal of said short circuit and deenergization of said first relay to supply current to a load connected across said power circuit, and a third relay having normally closed contacts connected in series with said one set of normally open contacts of said second relay, said third relay being connected to be responsive to the removal of load from said power circuit for opening its contacts to deenergize said second relay and thereby deenergize said line contactor.

14. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means for operating said valve, and means responsive to voltage change in said electric circuit for actuating said valve operating means.

15. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means responsive to arc voltage when an arc is struck between said electrode and the work for opening said valve and means responsive to open circuit voltage when said electrode is removed from the work to extinguish the arc for setting said time delay device to close said valve a predetermined time delay interval after the arc is extinguished.

16. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means responsive to arc voltage when the electrode is touched to the work momentarily without heating the electrode to oxidation temperature for opening said valve, said valve opening means being further responsive to arc voltage when a welding arc is struck for maintaining said valve open during the welding operation.

DEAN C. GIRARD.

REFERENCES CITED

The following references are of record in the file of this patent:

UNITED STATES PATENTS

| Number | Name | Date |
|---|---|---|
| 2,078,690 | Schueler | Apr. 27, 1937 |
| 2,140,386 | Jones | Dec. 13, 1938 |
| 2,329,904 | Howard | Sept. 21, 1943 |
| 2,387,889 | Dorfman | Oct. 30, 1945 |